UNITED STATES PATENT OFFICE.

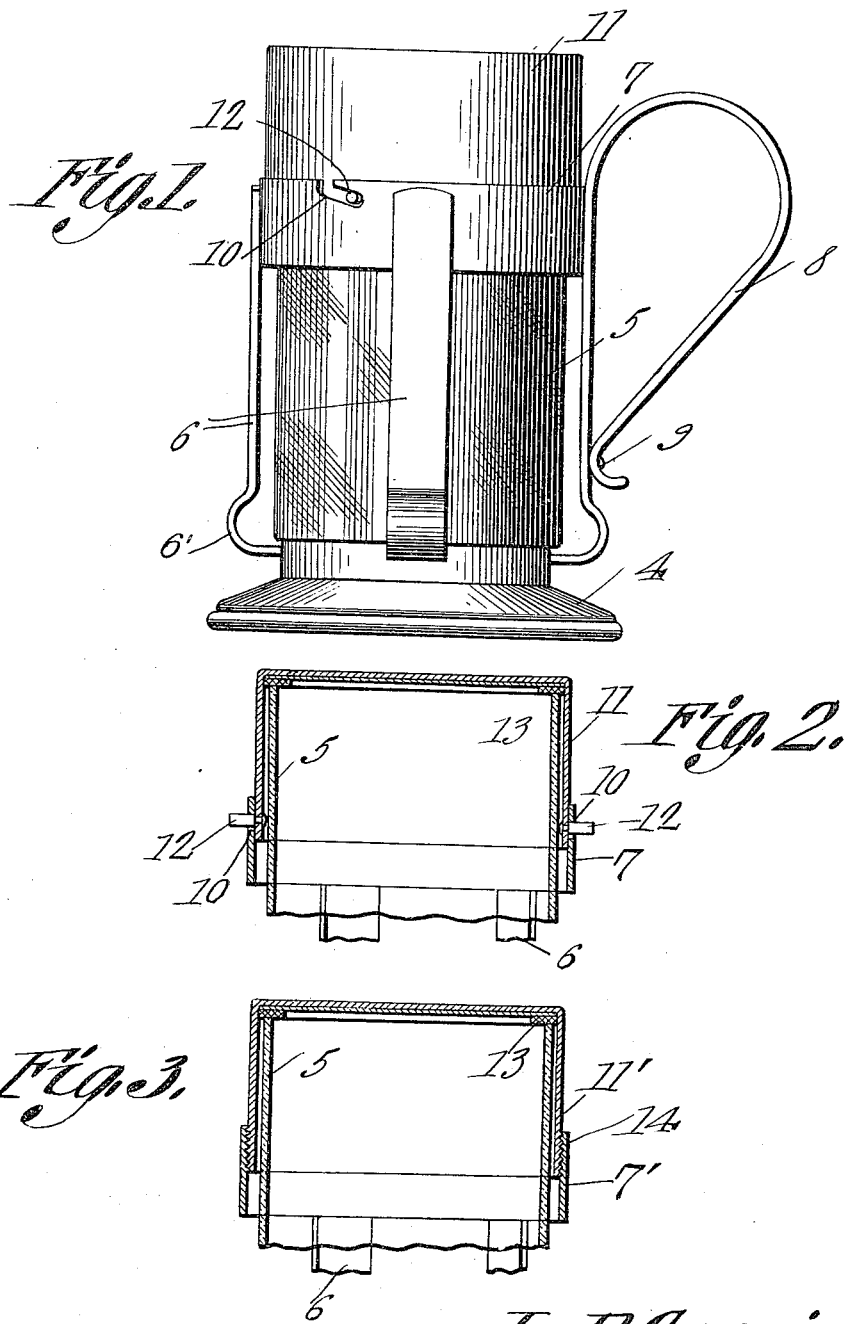

LOUIS P. CANNING, OF ATHENS, GEORGIA.

GLASS-HOLDER.

1,141,609.     Specification of Letters Patent.     Patented June 1, 1915.

Application filed November 26, 1913. Serial No. 803,256.

*To all whom it may concern:*

Be it known that I, LOUIS P. CANNING, a citizen of the United States, residing at Athens, in the county of Clarke and State of Georgia, have invented a new and useful Glass-Holder, of which the following is a specification.

This invention relates to improvements in glass holders.

An object of the present invention is to provide a glass holder so that a glass may be readily carried about without danger of the contents thereof being spilled.

A further object is to provide a holder in which a glass may be positioned and to which a removable cover may be secured, the same being adapted to fit down upon and effect a sealed joint with the upper rim of the glass.

A further object is to provide a glass holder such as used in connection with soda water fountains and to provide the holder with an interlocking cover fitting down upon the upper edge of the glass and effecting a sealed joint therewith so that the glass containing a liquid may be readily carried about without danger of the liquid being spilled therefrom, and which cover may be instantly removed when desired.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in elevation of my improved holder with a glass disposed therein. Fig. 2 is a longitudinal section of the upper portion of the holder and cover. Fig. 3 is a similar view of a somewhat modified form of the device.

Referring to the drawings in which similar reference numerals designate corresponding parts throughout the several views, the base 4 upon which the glass 5 rests is provided with the upstanding arms 6 which house the glass therein and prevent the lateral displacement thereof. Each of these arms 6 has an offset portion such as indicated at 6'.

Rigidly secured to the upper extremities of the arms 6 is the sleeve 7 of such size as to receive the glass 5 therein. A handle 8 of the ordinary type is formed by projecting one of the arms 6, bending it in the form illustrated and securing it as at 9 to the lower extremity of the said arm. The sleeve 7 is provided with the oppositely arranged slots 10 and which slots extend around the sleeve for a limited distance and also are inclined at an angle to the upper edge thereof.

A cover 11 is provided and may be of any height and is in the form of an inverted cup which fits down over and protects the upper portion of the glass. The said cover is provided with the outstanding trunnions or projections 12 which are so arranged as to simultaneously engage the oppositely disposed slots 10 which holds the said cover firmly down upon the upper rim of the glass 5. The cover is provided with the packing or washers 13 upon the inner surface of the top and said packing is formed of somewhat pliable material so that after the trunnions or projections have engaged the slots a slight rotation of the cover will result in the same being drawn down and brought into forcible contact with the upper rim of the glass. Inasmuch as the inner surface of the cover is provided with the packing described, a liquid tight joint will be effected between the cover and glass which will effectually prevent the liquid being displaced or spilled therefrom.

By providing each arm 6 with the offset portion 6' it will be apparent that should the cover be pressed downwardly upon the glass with excessive force, the said glass will not become crushed as would be the case should a stiff connection be provided between the sleeve 7 and the base 4 but, instead, the arm 6 will tend to elongate, thereby relieving the glass of the excessive pressure.

A somewhat modified structure is illustrated in Fig. 3, in which the upper cup-like cover 11' is threaded at its lower extremity as at 14 and said cover is adapted to engage the internally threaded sleeve 7'. The cover when so attached may be drawn down into forcible engagement with the upper rim of the glass in precisely the same manner as the cover 11 previously described. Thus it will be apparent that I have provided an improved glass holder whereby a glass is properly housed within a skeleton-like structure which renders the contents of the glass visible and at the same time provides a ready and convenient device for the carrying of the glass and the liquid contents thereof about. The angle of the slots 10 is such that the cover will be retained securely in place after having been once rotated into forcible contact with the upper rim of the glass. The entire device is simple in structure, may be cheaply manufactured, and will be efficient for the purpose intended.

Having thus fully described my invention, what I claim is:—

A glass holder comprising a base, a sleeve, spaced connections between the sleeve and base, each of said connections having an outwardly offset resilient portion, said sleeve being adapted to receive a glass mounted on the base, a cup-like cover, and coöperating means upon the cover and sleeve adapted to draw the cover downwardly onto the glass when said cover is rotated relative to the sleeve.

In testimony that I claim the foregoing as my own, I have hereto affixed my signature in the presence of two witnesses.

LOUIS P. CANNING.

Witnesses:
W. H. SHELTON,
BEN H. WEATHERLY.